United States Patent [19]

Takaoka

[11] Patent Number: 5,072,237

[45] Date of Patent: Dec. 10, 1991

[54] THERMAL PRINTER FOR A PORTABLE DATA TERMINAL

[75] Inventor: Hiroaki Takaoka, Kanagawa, Japan

[73] Assignee: Kabushiki Kaisha Toshiba, Kanagawa, Japan

[21] Appl. No.: 496,686

[22] Filed: Mar. 21, 1990

[30] Foreign Application Priority Data

Mar. 31, 1989 [JP] Japan .................................. 1-078426

[51] Int. Cl.[5] .............................................. G01D 15/10

[52] U.S. Cl. ................................ 346/76 PH; 395/101

[58] Field of Search ..................... 346/76 PH; 364/519

[56] References Cited

U.S. PATENT DOCUMENTS

| | | | |
|---|---|---|---|
| 4,447,819 | 5/1984 | Moriguchi et al. | 346/76 PH |
| 4,638,329 | 1/1987 | Nakayama et al. | 346/76 PH |
| 4,734,710 | 3/1988 | Sato et al. | 346/76 PH |
| 4,738,553 | 4/1988 | Uemura et al. | 346/76 PH |
| 4,875,056 | 10/1989 | Ono | 346/76 PH |

*Primary Examiner*—Benjamin R. Fuller
*Assistant Examiner*—Nancy Le
*Attorney, Agent, or Firm*—Banner, Birch, McKie & Beckett

[57] ABSTRACT

A thermal printer is provided which is coupled to include a source of printing signals, such as a portable hand held computer or data terminal, for printing an image on a sheet of printing material in accordance with the printing signals. The thermal printer includes a printer controller and a thermal printing head which includes a plurality of thermal heating elements aligned in a row across the sheet of printing material to generate heat to thereby print dots on the printing material. These heat generating elements are powered by a battery having limited size and power. The printer controller receives the printing signals and generates dot signals in response thereto for activating selected heat generating elements. The printer controller includes a counter which counts the number of dot signals. Depending on the number of dot signals for each line or row, the printer controller activates an optimum number of groups of heat generating elements to maximize printing speed for the amount of power available. In some instances, all the heat generating elements in a particular row may be activated and in other instances, different combinations of groups of heat generating elements will be activated depending on the number and position of the heat generating elements which must be activated to form one row or line of the desired image.

38 Claims, 5 Drawing Sheets

THERMAL PRINTER FOR A PORTABLE DATA TERMINAL

BACKGROUND OF THE INVENTION

1. Field of the Invention

The present invention generally relates to a thermal printer for a portable data terminal, and more particularly to a thermal printer having a thermal printing head which is capable of printing an image on sheet material with rapidity despite the availability of a limited power source for driving the thermal printing head.

2. Description of the Related Art

A thermal printer employs heat in order to form an image on sheet material. There are two basic types of thermal printers depending on the particular sheet material employed. One type of thermal printer employs a thermal printing head having a plurality of thermal printing elements which selectively generate and apply heat to a heat sensitive paper to thereby form an image on the paper. Another type of thermal printer is one that employs similar thermal printing elements, however, an ink donor, such as an ink ribbon, is used for transferring ink to standard paper in response to heat generated by the thermal printing elements.

Printing speed for the above thermal printers depends in large part on the number of thermal printing or heat generating elements, and particularly on the number of these elements which can be driven at the same time. Since the development of semiconductor technology has made it possible to make a long thermal head including a large number of thermal printing or heat generating elements, it is important to drive as many of these elements at the same time as possible in order to reduce printing time. However, in order to drive these heat generating elements simultaneously, a battery with large power is required.

Thermal printers of the above type have several advantages, including small size and the ability to print quietly. Additionally, thermal printers which use heat sensitive paper are extremely small sized. As a result, the latter thermal printers can be employed as printing devices in portable apparatus, such as portable computers or data terminals or portable calculators. However, since small size and light weight is critical in a portable apparatus, the size of the battery is limited, which in turn limits battery power. Accordingly, since printing speed depends on how many thermal printing or heat generating elements can be driven at the same time, the limited power of the battery in prior art thermal printers prevents rapid printing.

SUMMARY OF THE INVENTION

It is an object of the present invention to provide a thermal printer which is capable of rapidly printing an image despite the availability of a limited power source.

It is another object of the present invention to provide a small-sized apparatus such as a portable computer or data terminal having a thermal printer which is capable of rapidly printing images for such apparatus.

In accordance with the present invention, a thermal printer is provided which is coupled to include a source of printing signals, such as a portable hand held computer or data terminal, for printing an image on a sheet of printing material in accordance with the printing signals. The thermal printer includes a printer controller and a thermal printing head which includes a plurality of thermal heating elements aligned in a row across the sheet of printing material to generate heat to thereby print dots on the printing material. These heat generating elements are powered by a battery having limited size and power. The printer controller receives the printing signals and generates dot signals in response thereto for activating selected heat generating elements. The printer controller includes a counter which counts the number of dot signals. Depending on the number of dot signals for each line or row, the printer controller activates an optimum number of groups of heat generating elements to maximize printing speed for the amount of power available. In some instances, all the heat generating elements in a particular row may be activated and in other instances, different combinations of groups of heat generating elements will be activated depending on the number and position of the heat generating elements which must be activated to form one row or line of the desired image.

BRIEF DESCRIPTION OF THE DRAWINGS

Other objects and many of the attendant advantages of this invention will be readily appreciated as the invention becomes better understood by reference to the following detailed description when considered in connection with the accompanying drawings, in which like reference numerals designate the same or similar parts throughout the figures thereof.

DESCRIPTION OF THE PREFERRED EMBODIMENTS

Figure 1:
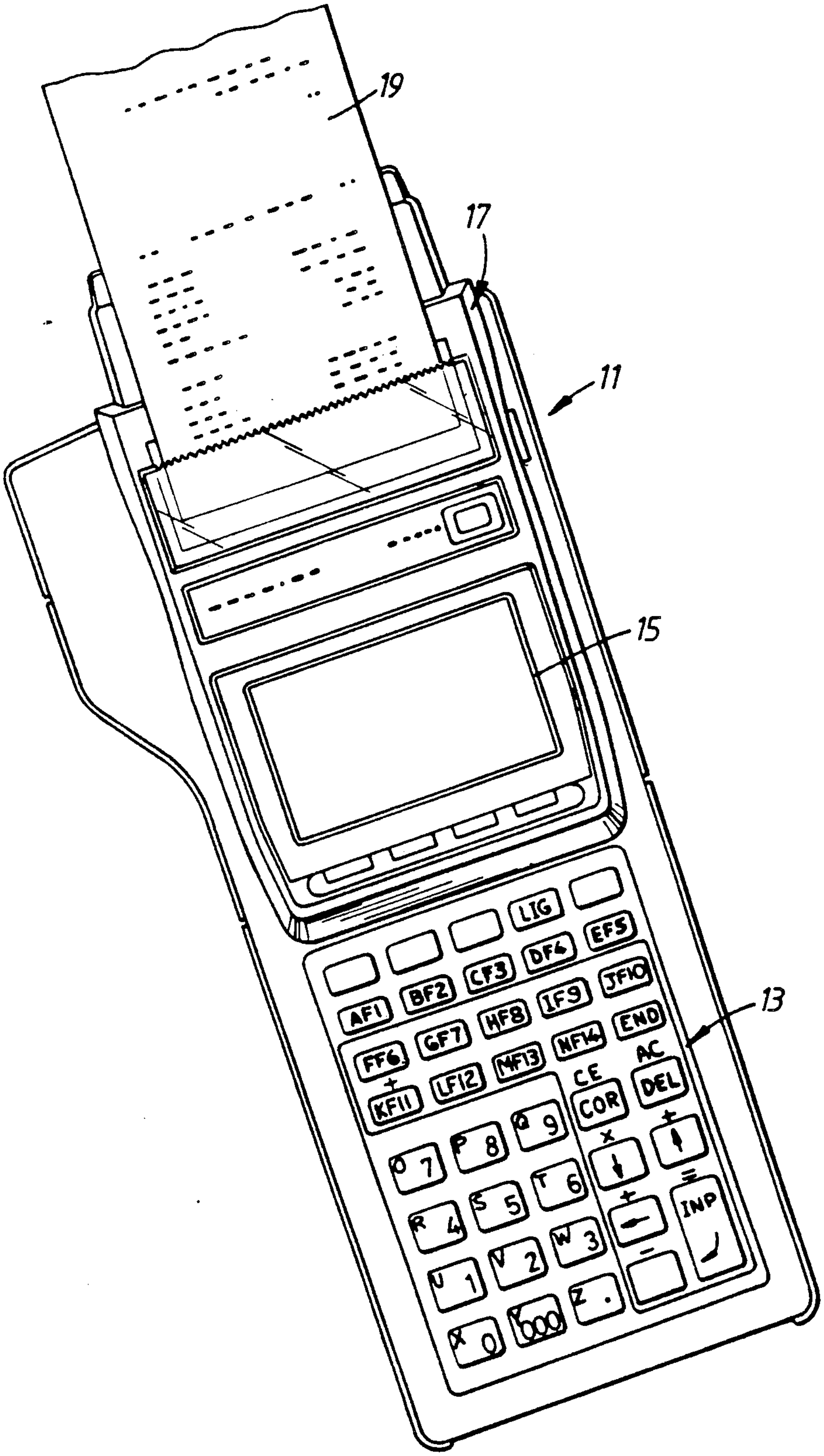
FIG. 1 is a perspective view of a portable computer or data terminal according to the present invention.

Referring now to FIG. 1, a portable hand held computer or data terminal 11 is shown which includes keyboard 13 for inputting data or commands. Display device 15, such as a liquid-crystal display (LCD), displays information including data or commands input by keyboard 13. Thermal printer 17 forms an image on heat sensitive paper 19 in response to commands supplied from CPU 21 as described below. Keyboard 13, LCD 15 and thermal printer 17 form an integrated unit.

Figure 2:
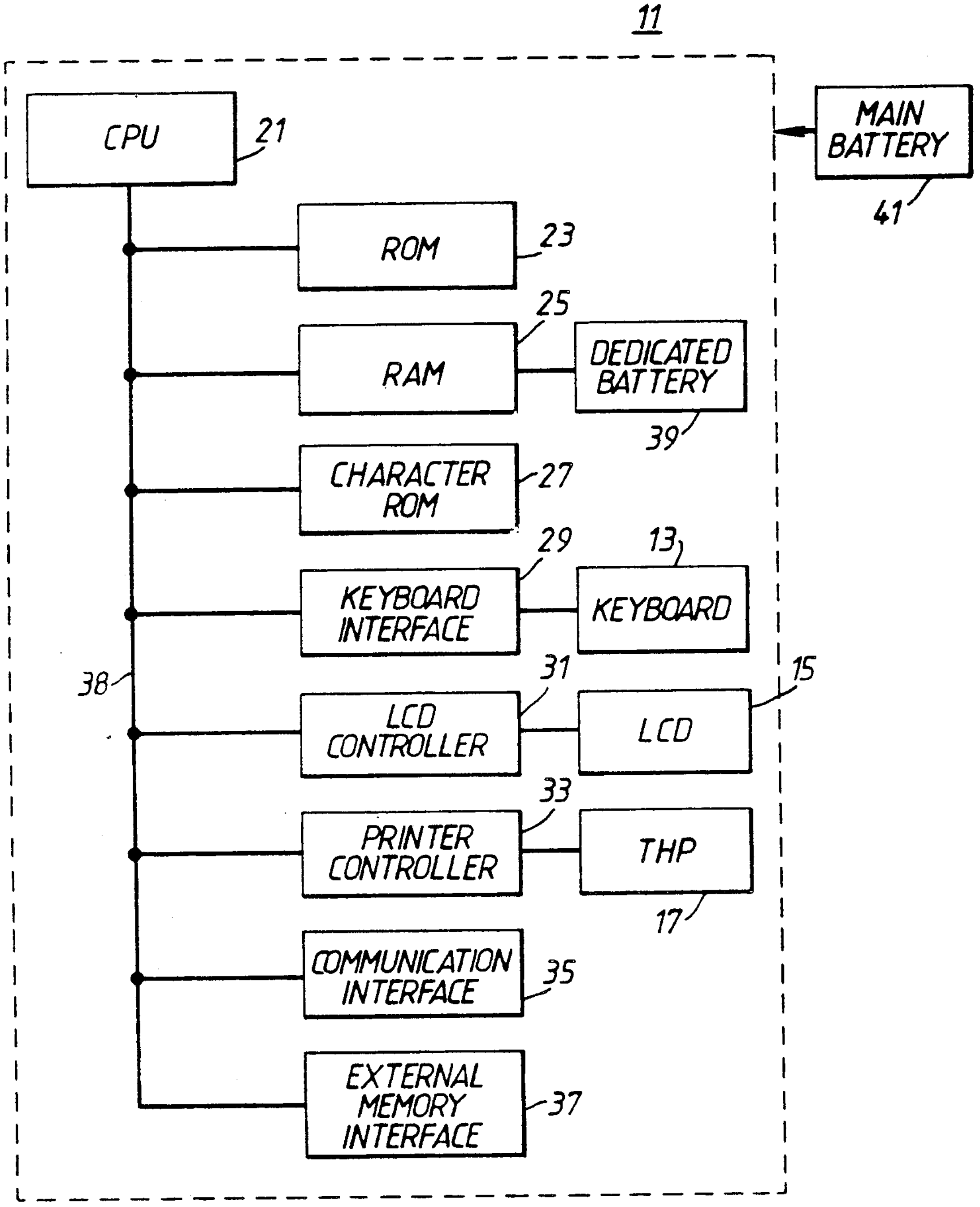
FIG. 2 is a block diagram of the portable computer or data terminal shown in FIG. 1.

Referring now to FIG. 2, the electrical circuit for portable data terminal 11 is shown in block diagram form. CPU 21 controls the operation of portable data terminal 11 by executing a program stored in ROM 23. RAM 25 is a temporary storage device for storing data during execution of the program by the CPU. Although the capacity of ROM 23 and RAM 25 is a matter of design choice, in the present embodiment, ROM 23 is 64K byte and RAM 25 is selected from 256K, 512K or 768K byte memory.

As further shown in FIG. 2, character ROM 27 stores information corresponding to a plurality of writing characters such as the Roman alphabet and/or kanji characters. Keyboard interface 29 electrically couples keyboard 13 to CPU 21. LCD controller 31 controls LCD 15 in response to commands supplied from CPU 21. Printer controller 33 controls thermal printer 17 in response to commands supplied by CPU 21. Communication interface 35 electrically couples CPU 21 to an external communicating device (not shown). External memory interface 37 electrically couples CPU 21 to an external memory, such an IC card or a memory card that may be coupled mechanically to the portable computer or data terminal. CPU 21 is coupled to ROM 23, RAM 25, character ROM 27, keyboard interface 29, LCD and printer controllers 31 and 33, communication and external memory interfaces 35 and 37 through bus 38.

A dedicated battery 39, located inside portable data terminal 11, supplies power to RAM 25. Main battery 41, which is detachably connected to portable data terminal 11 like a cartridge, supplies power to the electrical circuit of portable data terminal 11. Main battery 41 is a small sized battery having a power level which is determined as a function of the maximum current capacity of a group of thermal printing elements as described in further detail below.

Figure 3:
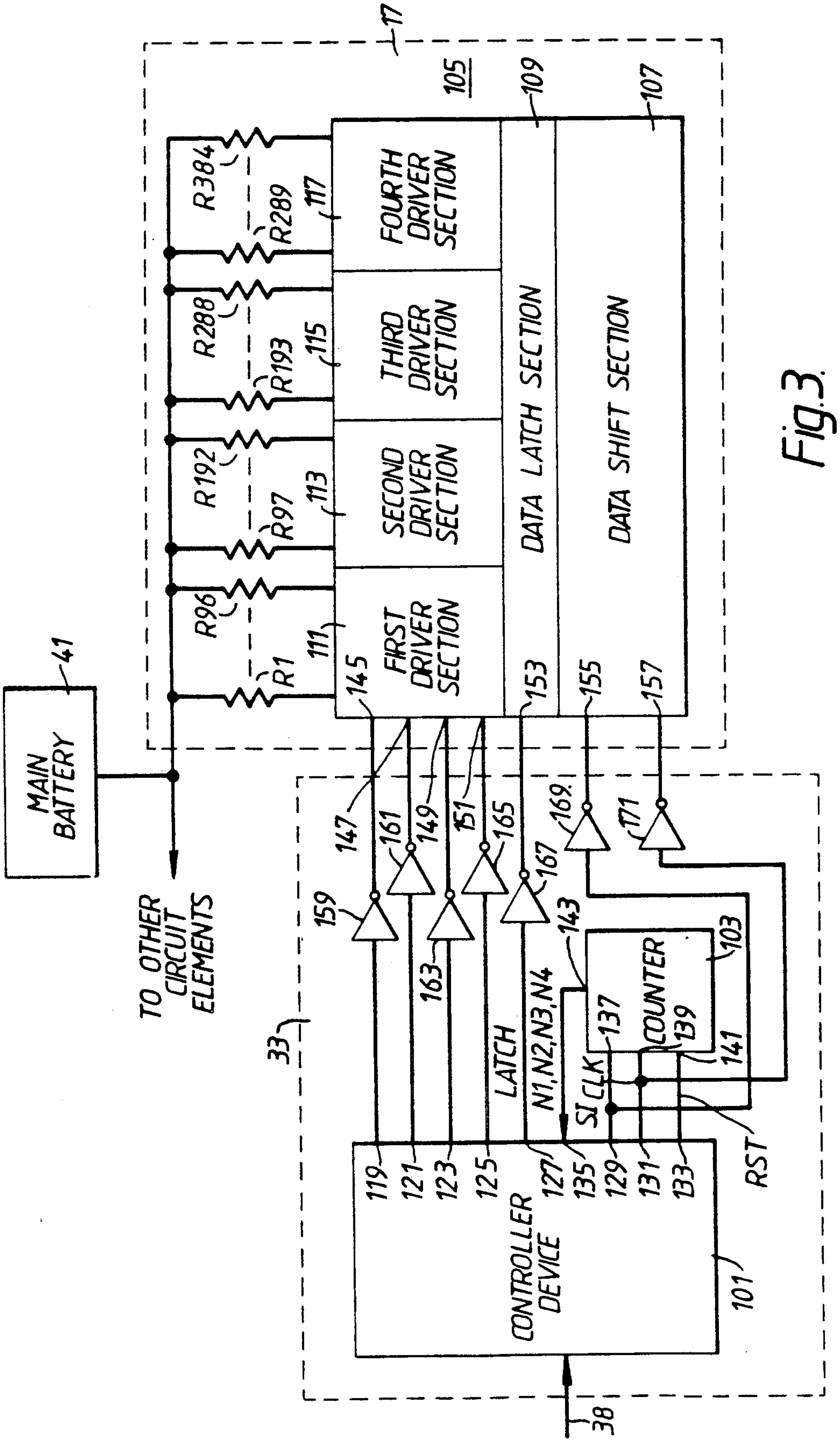
FIG. 3 is a detailed block diagram of a printer controller and a thermal printer used in the portable computer or data terminal shown in FIG. 2.

Referring now to FIG. 3, the details of printer controller 33 and thermal printer 17 will be explained. Printer controller 33 includes control device 101 for receiving printing signals containing data to be printed from CPU 21 or character ROM 23 through bus 38. The printing signals also may be derived by CPU 21 from communication interface 35 or external memory interface 37. Control device 101 generates a plurality of dot printing signals from the printing signals which it outputs to printer 17 which prints an image in the form of a selected dot pattern in response to the dot printing signals. In one embodiment, control device 101 may be a Z80 C88 microprocessor manufactured by Zilog, Inc. (Z80 is a trademark of Zilog, Inc.). Printer controller 33 includes counter 103 for counting the number of dot printing signals which are active (hereinafter "dot signals"), i.e., the number which cause the thermal printer to print dots on the sheet of printing material.

Thermal printer 17 includes a thermal printing head having a plurality of thermal printing elements or heat generating elements R1 to R384 aligned in a row as described below for printing a line of an image in accordance with their selective energization. The heat generating elements generate heat in response to the active dot printing signals or dot signals supplied by printer controller 33. Each heat generating element R1 to R384 corresponds to one dot in a row of dots, and accordingly, upon selection of particular heat generating elements, one line of an image is formed on heat sensitive paper 19 with each energization of selected elements R1–R384. An entire image is formed by the successive energization of selected ones of the heat generating elements to thereby form multiple lines of dots on the sheet of printing material.

In one embodiment, thermal printer 17 is designed to print 16 kanji characters or 32 Roman alphabet characters along one line of heat sensitive paper 19. Each kanji character is represented by dots in a 24 (row)×24 (column) matrix. Each Roman alphabet character is represented by dots in a 12 (row)×24 (columns) matrix. Thus, the number of heat generating elements is equal to the number of maximum dots in one row, e.g., 16×24 or 32×12=384. According to the present invention, heat generating elements R1 to R384 are divided into a plurality of groups, such as four groups in the preferred embodiment. The first group includes elements R1 to R96. The second group includes elements R97 to R192. The third group includes elements R193 to R288. The fourth group includes element R189 to R384.

Thermal printer 17 includes driver device 105 for driving heat generating elements R1 to R384 in response to the dot printing signals supplied by control device 101. Driver device 105 comprises data shift section 107, which includes a shift register for shifting the dot printing signals. The dot printing signals are serial-in data signals or SI signals which cause selected ones of heat generating elements R1 to R384 to generate heat. Data latch section 109 includes a series of latch circuits. Data latch section 109 outputs stored signals and then stores SI signals received from data shift section 107 in response to a LATCH signal supplied by control device 101. Driver device 105 comprises a plurality of driver sections, e.g., first to fourth driver sections 111, 113, 115 and 117, for driving heat generating elements R1 to R384. Driver device 105 may be a standard IC chip such as the SED 5232DA manufactured by Suwa Seiko Company.

Referring to FIG. 3 in greater detail, one end of each heat generating element R1 to R384 is coupled to main battery 41. The other end of each heat generating element R1 to R384 is coupled to one of the first to fourth driver sections 111, 113, 115 and 117 of driver device 105. Each driver section 111, 113, 115 and 117 outputs driving signals at level "1" or "0". When driver sections 111, 113, 115 and 117 output driving signal "0", which corresponds to a no dot signal, elements R1 to R384 generate no heat. When driver sections 111, 113, 115 and 117 output driving signal "1", which corresponds to a dot signal, main battery 41 is connected to ground through elements R1 to R384 so that electric current flows. Elements R1 to R384 are resistive elements which generate heat in response to the electric current supplied by main battery 41.

Since all heat generating elements R1 to R384 are coupled in parallel to main battery 41 as illustrated in FIG. 3, in those instances in which the printed image requires a solid line across the heat sensitive paper, all heat generating elements R1 to R384 would be required to generate heat simultaneously. Accordingly, it is desirable that main battery 41 be large enough to supply electric current simultaneously to all heat generating elements R1 to R384 However, in a portable hand held data terminal 11, it also is desirable to have main battery 41 be small and light weight, which restricts the maximum power of main battery 41. In the present invention, the maximum power of main battery 41 is not enough to supply current simultaneously to all elements R1 to R384.

According to the preferred embodiment of the present invention, main battery 41 is able to supply electric current simultaneously to only 96 of the heat generating elements. This means that heat generating elements R1 to R384 are divided into four groups. However, as is apparent to one of skill in the art, the number of divided groups of heat generating elements R1 to R384 depends on the power of main battery 41. Each group of 96 heat generating elements is coupled to one of driver sections 111, 113, 115 and 117, respectively. Each driver section 111, 113, 115 and 117 is able to simultaneously supply driving signals "1" corresponding to dot signals to all 96 heat generating elements coupled thereto.

The details of printer controller 33 now will be explained. Control device 101 has eight output terminals 119, 121, 123, 125, 127, 129, 131 and 133. It also includes one input terminal 135 and bus 38. Counter 103 has three input terminals 137, 139 and 141, and one output terminal 143. Driver device 105 has 7 input terminals 145, 147, 169, 151, 153, 155 and 157. Output terminals 119, 121, 123 and 125 of control device 101 are coupled to input terminals 145, 147, 149 and 151 of driver device 105 through inverters 159, 161, 163 and 165, respectively. Output terminals 127 of control device 101 is coupled to input terminal 153 of driver device 105 through inverter 167. Output terminals 129, 131 and 133 of control device 101 are coupled to input terminals 137, 139 and 141 of counter 103, respectively. Output terminals 129 and 131 of control device 101 also are coupled to input terminals 155 and 157 of driver device 105 through inverters 169 and 171, respectively. Output terminal 143 of counter 103 is coupled to input terminal 135 of control device 101.

In the above configuration, control device 101 serially outputs SI signals through output terminal 129 to both counter 103 and data shift section 107. The SI signals include a series of data bits which identify printing dots. For example, SI signal level "0" (which corresponds to a dot signal) causes elements R1 to R384 to generate heat so that black dots are formed on heat sensitive paper 19. SI signal level "1" (which corresponds to a no dot signal) renders elements R1 to R384 inactive so that no printing takes place on heat sensitive paper 19. Control device 101 outputs SI signals synchronously with clock signal CLK, which is input to both counter 103 and data shift section 107.

Counter 103 counts dot signals, e.g., "0" SI signals synchronously with clock signal CLK. Counter 103 stops counting in response to a counter clear signal RST supplied by control device 101 through output terminal 133 of control device 101 to input terminal 141 of counter 103. Control device 101 outputs signal RST in accordance with the end of a line or row on heat sensitive paper 19.

Figure 4:
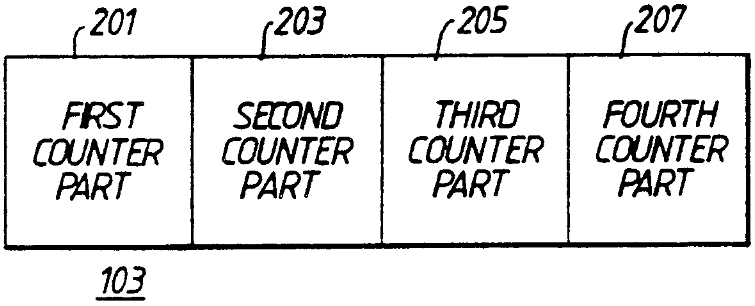
FIG. 4 illustrates the structure of a counter used in the printer controller shown in FIG. 3.

Referring now to FIG. 4, counter 103 includes first, second, third and fourth counter parts 201, 203, 205 and 207. Counter parts 201, 203, 205 and 207 correspond to first, second, third and fourth driver sections 111, 113, 115 and 117, respectively. For example, counter part 201 counts dot signals, e.g., "0" SI signals, to be supplied to the first group of elements R1 to R96 associated with first driver section 111. Likewise, counter parts 203, 205 and 207 count dot signals to be supplied to the second, third and fourth groups of elements R97 to R192, R193 to R288 and R289 to R384, respectively, which are associated with the second, third and fourth driver sections.

Upon counting dot signals in one line or row, counter 103 generates signals indicating the numbers N1, N2, N3 and N4 of dot signals. These number signals N1, N2, N3 and N4 indicate how many heat generating elements must be energized in each printing row, which in turn indicates the amount of power required from main battery 41 for that particular row. Counter 103 serially outputs these four number signals N1, N2, N3, N4 to input terminal 127 of control device 101. Control device 101 controls driver device 105 in response to these four number signals as described below.

Referring again to FIG. 3, control device 101 outputs SI signals to the input terminal 155 of data shift section 107 through inverter 169. As described above, SI signals are serial. The first signal of the SI signal for a particular line or row corresponds to heat generating element R384. The last signal of the SI signal corresponds to heat generating element R1. Data shift section 107 shifts inverted SI signals from left to right in accordance with elements R1 to R384.

Data shift section 107 stores a plurality of dot signals and no dot signals in accordance with the arrangement of heat generating elements R1 to R384. Dot signals include "1" signals and no dot signals include "0" signals which together form an image pattern for a single line or row on heat sensitive paper 19. A group of "1" and "0" signals is divided into a plurality of subgroups, e.g., four subgroups, in accordance with the groups of heat generating elements R1 to R384. These four subgroups of "1" and "0" signals are referred to as dot patterns X1, X2, X3 and X4.

After control device 101 outputs signal RST at the end of one line or row, control device 101 outputs a LATCH signal to input terminal 153 of data latch section 109 through inverter 167. In response to the LATCH signal, data latch section 109 latches all dot signals and no dot signals stored in data shift section 107.

Figure 5:
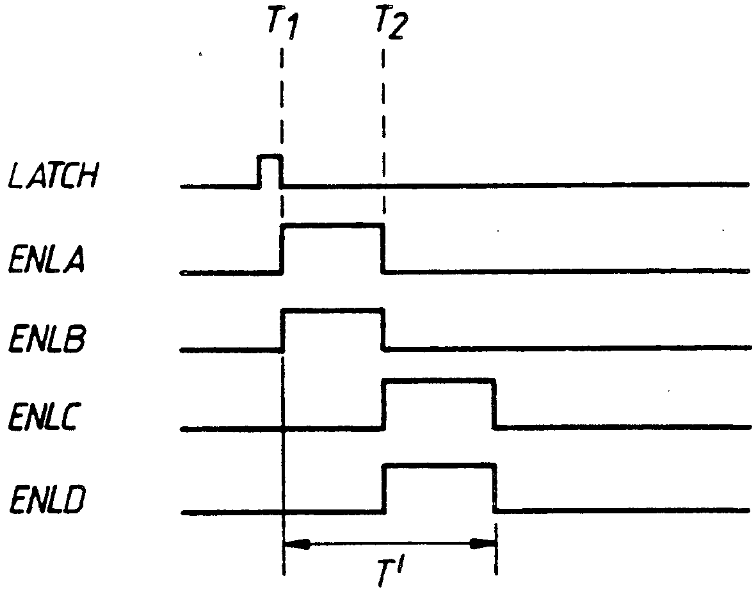
FIG. 5 illustrates one sample of a wave form of outputs from the printer controller to the thermal printer shown in FIG. 3.

Control device 101 selectively enables driver section 111, 113, 115 and 117 in response to number signals N1, N2, N3 and N4 as described below. Control device 101 outputs enable signals ENLA, ENLB, ENLC and ENLD causing driver sections 111, 113, 115 and 117 to supply dot signals to heat generating elements R1 to R384. For example, if N1=42, N2=14, N3=30 and N4=28, control device 101 outputs an "0" ENLA signal and an "0" ENLB signal at time T1, which are inverted by inverters 159 and 161 before being supplied to first and second driver sections 111 and 113. The inverted ENLA and ENLB signals at time T1 are shown in FIG. 5. At time T2, control device 101 outputs an "0" ENLC signal and an "0" ENLD signal, which are inverted by inverters 163 and 165 before being supplied to third and fourth driver sections 115 and 117. The inverted ENLC and ENLD signals at time T2 are shown in FIG. 5. Input terminals 145, 147, 149 and 151 are coupled to first, second, third and fourth driver sections 111, 113, 115 and 117, respectively.

In response to the ENLA and ENLB signals shown in FIG. 5, first and second driver sections 111 and 113 drive the first and the second groups of heat generating elements R1 to R96 and R97 to R192 at time T1. In response to the ENLC and ENLD signals shown in FIG. 5, third and fourth driver sections 115 and 117 drive the third and the fourth groups of elements R193 to R288 and R289 to R384. Driver sections 111, 113, 115 and 117 supply dot signals from data latch section 105 to heat generating elements R1 to R384 to selectively energize these heat generating elements. Each element R1 to R384 generates heat in response to a "1" level dot signal. In the example given above, the printing of the line or row requires two printing cycles of a duration T1, one printing cycle corresponding to the level "1" ENLA and ENLB signals and another corresponding to the level "1" ENLC and ENLD signals.

Figure 6:
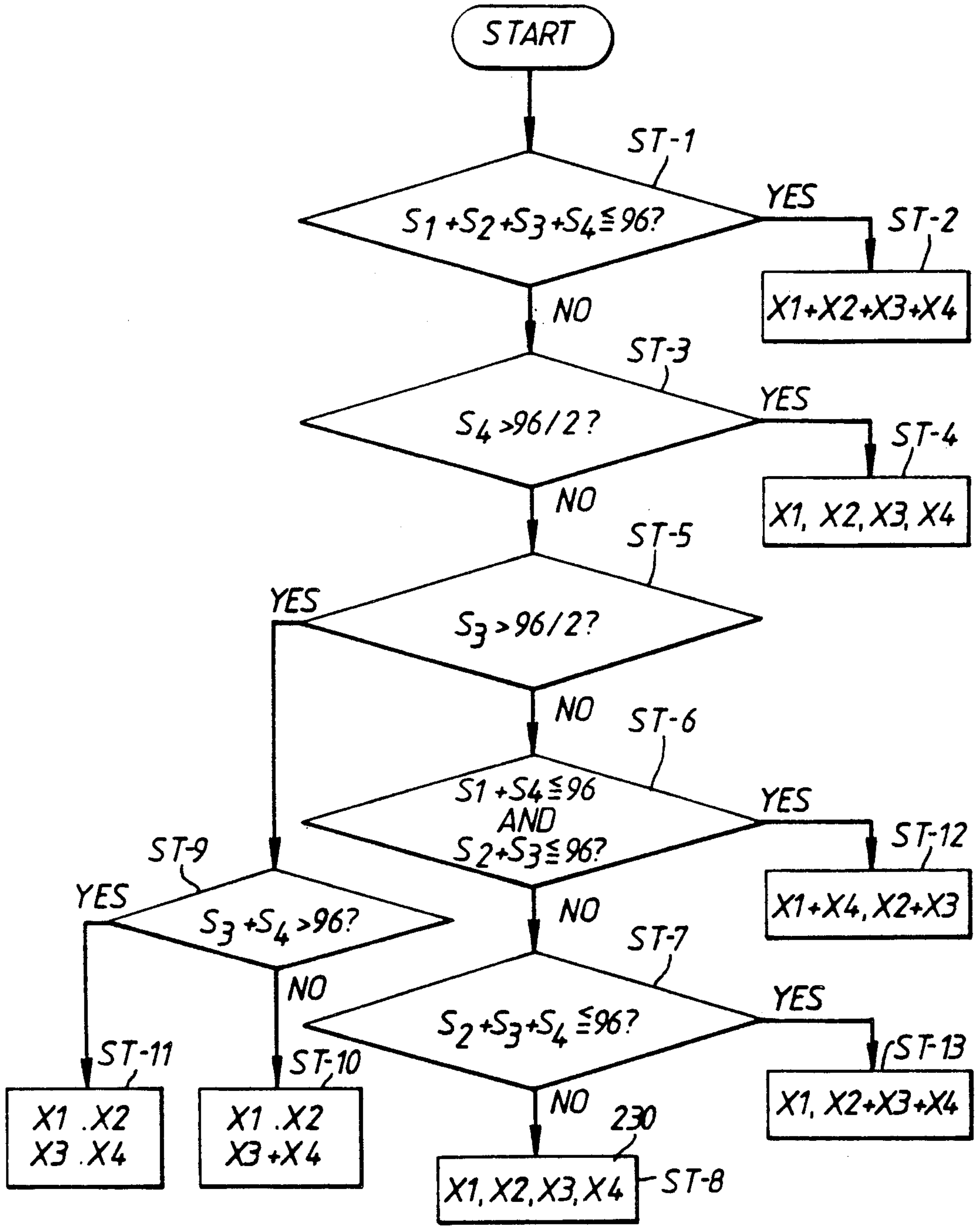
FIG. 6 is a flow chart illustrating the operation of the thermal printer shown in FIG. 3.

Referring now to FIG. 6, the operation of the thermal printer of the present invention will be described in connection with a flow chart. As described above, data shift section 107 stores a plurality of dot printing signals. The dot printing signals include "0" and "1" signals which form an image pattern for printing on heat sensitive paper 19. These "1" and "0" signals are supplied to heat generating elements R1 through R384. Each element R1–R384 generates heat in response to a "1" level dot signal.

As described above, groups of dot signals and no dot signals are referred to as dot patterns X1, X2, X3 and X4. These dot patterns, which include "0" and "1" signals, correspond to the groupings of heat generating elements, i.e., X1 corresponds to heat generating elements R1–96, and so forth. The number of "1" dot signals in each dot pattern are identified as numbers N1, N2, N3 and N4. Preliminarily, control device 101 sorts number N1, N2, N3 and N4 in accordance with magnitude. After sorting, numbers N1, N2, N3 and N4 are arranged in sorted numbers S1, S2, S3 and S4. In accordance with the arrangement of S1, S2, S3 and S4, dot patterns X1, X2, X3 and X4 are arranged in sorted dot patterns D1, D2, D3 and D4.

First, control device 101 sums sorted number S1, S2, S3 and S4. At step ST-1 in FIG. 6, control device 101 detects whether the summation of S1, S2, S3 and S4 is equal to or less than 96. If the summation of S1, S2, S3 and S4 is equal to or less than 96, control device 101 outputs signals ENLA, ENLB, ENLC and ENLD at level "1" in order to simultaneously drive all four driver sections 111, 113, 115 and 117. This is because, when the summation of S1–S4 is equal to or less than 96, it is possible for main battery 41 to supply current to all the selected heat generating elements in the dot pattern for the particular line or row. Thus, as illustrated in step ST-2, where the mark "+" indicates the dot patterns which are simultaneously driven, dot patterns X1–X4 are simultaneously printed by thermal printer 17.

If the summation of S1, S2, S3 and S4 exceeds 96 at step ST-1, control device 101 does not enable drive device 105 to simultaneously drive selected ones of elements R1 to R384. Alternatively, control device 101 determines at step ST-3 whether sorted number S4, which is the smallest of the four sorted numbers S1, S2, S3 and S4, exceeds one half of 96. If sorted number S4 exceeds one half of 96, control device 101 outputs the ENLA, ENLB, ENLC, and ENLD signals in succession at level "1". Thus, the four groups of heat generating elements R1 to R384 are driven at different times as indicated at step ST-4. This occurs because the summation of any two numbers selected from sorted numbers N1, N2, N3 and N4 exceeds 96 so that main battery 41 cannot supply current at the same time to any two groups of heat generating elements R1 to R384.

At step ST-3, if the smallest sorted number S4 is equal to or smaller than one half of 96, control device 101 determines at ST-5 whether sorted number S3, the second smallest of the four sorted numbers S1, S2, S3 and S4, exceeds one half of 96. If sorted number S3 is equal to or smaller than 48, control device 101 then determines at step ST-6 whether the summation of both (S1 and S4) and (S2 and S3) are equal to or smaller than 96. If the summation of one or both (S1 and S4) and the (S2 and S3) exceeds 96, control device 101 determines at step ST-7 whether the summation of S2, S3 and S4 is equal to or smaller than 96. If the summation of S2, S3 and S4 exceeds 96, at step ST-8, control device 101 outputs two level "1" enable signals selected from signals ENLA, ENLB, ENLC and ENLD in accordance with sorted dot patterns D3 and D4. That is, two groups of heat generating elements selected from the four groups of elements R1 to R384 are supplied with current at the same time. This is because sorted numbers S3 and S4 are determined to be smaller than 48 at steps ST-3 and ST-5.

At step ST-5, if the second smallest sorted number S3 exceeds 48, control device 101 determines at step ST-9 whether the summation of S3 and S4 exceeds 96. If the summation of S3 and S4 is equal to or smaller than 96 at step ST-10, control device 101 enables drive device 105 to simultaneously drive two groups of heat generating elements in accordance with sorted dot patterns D3 and D4. That is, control device 101 outputs two level "1" enable signals in accordance with sorted dot patterns D3 and D4.

If the summation of S3 and S4 exceeds 96 at step ST-9, control device 101 enables drive device 105 to drive the four groups of heat generating elements R1 to R384 in succession as indicated at step ST-11. This occurs because there is no combination of numbers selected from numbers S1, S2, S3 and S4 which is equal to or smaller than 96.

At step ST-6, if the summation of sorted numbers S1 and S4 and the summation of sorted numbers S2 and S3 are equal to or smaller than 96, control device 101 enables drive device 105 to simultaneously drive two groups of heat generating elements. That is, as shown at step ST-12, the groups of heat generating elements associated with dot patterns X1 and X4 are driven simultaneously. Then, at a different time, the groups of heat generating elements associated with dot patterns X2 and X3 are driven simultaneously.

Finally, at step ST-7, if the summation of sorted numbers S2, S3 and S4 is equal to or smaller than 96, control device 101 enables driver device 105 to simultaneously drive three groups of heat generating elements in accordance with dot patterns X2, X3 and X4 as indicated at step ST-13. The remaining group of heat generating elements is driven after or before the above three groups of heat generating elements.

Other objects, features and advantages of the present invention will become apparent from the above detailed description. It should be understood, however, that the detailed description and specific examples, while indicating preferred embodiments of the invention, are given by way of illustrations only, since various changes and modifications within the spirit and scope of the invention will become apparent to those skilled in the art.

I claim:

1. A portable hand held data terminal comprising:

input means operable by a user for inputting data and commands;

memory means for storing a program;

processing means coupled to said input means and said memory means for processing data and commands input by said input means in accordance with an execution of the program stored in said memory means, said processing means further generating printing signals during execution of the program; and thermal printing means coupled to said processing means for printing images on a sheet of printing material in response to the printing signals, said thermal printing means comprising:

a thermal printing head having a plurality of thermal printing elements grouped in at least two groups positioned adjacent to the sheet of printing material, each thermal printing element having a capability of printing a dot on the sheet of printing material in response to a dot signal;

driver means coupled to said thermal printing head for providing the dot signals to selected ones of said groups of thermal printing elements; and print control means responsive to the print signals from said processing means for generating the dot signals for each printing line and providing the dot signals to said driver means, said print control means (1) counting a number of dot signals in at least two groups corresponding to the at least two groups of thermal printing elements in each printing line, (2) sorting the at least two groups of dot signals and determining an optimum combination of said groups of thermal printing elements to receive the dot signals in order to minimize print time for each printing line, and (3) enabling said driver means to drive selected ones of said groups of thermal printing elements in accordance with the optimum combination.

2. The portable hand held data terminal of claim 1 further comprising a power supply coupled to said processing means and said thermal printing means, said power supply providing a power level less than the power level required to simultaneously drive all of said thermal printing elements.

3. The portable hand held data terminal of claim 2 wherein said power supply is a small sized portable power supply.

4. The portable hand held data terminal of claim 2 wherein the power level of said power supply is substantially equal to a maximum current capacity of the thermal printing elements of a largest of said groups of thermal printing elements.

5. The portable hand held data terminal of claim 4 wherein the power level of said power supply is substantially equal to the maximum current capacity of approximately 96 thermal printing elements.

6. The portable hand held data terminal of claim 4 wherein said thermal printing elements is approximately 384, said groups is four and the power level of said power supply is substantially equal to the maximum current capacity of 96 thermal printing elements.

7. The portable hand held data terminal of claim 1 further comprising read only memory means coupled to said processing means for storing writing characters, and wherein said processing means, upon execution of the program, reads writing characters from said read only memory means to generate the printing signals.

8. The portable hand held data terminal of claim 1 further comprising a communications interface connectable with an external data source, and wherein said processing means, upon execution of the program, receives writing characters from the external data source and generates the printing signals therefrom.

9. The portable hand held data terminal of claim 1 further comprising an external memory interface connectable with an external memory, and wherein said processing means, upon execution of the program, receives writing characters from the external memory and generates the printing signals therefrom.

10. The portable hand held data terminal of claim 1 wherein said plurality of thermal printing elements is (A), said at least two groups of thermal printing elements is (B), (C) equals a number of dot signals in one printing line and (D1), (D2), . . . (Dn) equals a number of dot signals in group (B1), (B2), . . . (Bn), said print control means counting (C) for each printing line and (1) determining if (C) is less than or equal to A/B, and if so, enabling said driver means to simultaneously drive all said groups of thermal printing elements, and if not, (2) determining (D) for said group having a smallest number of dot signal (D min) and determining if (D min) is greater than one half of A/B, and if so, enabling said driver means to successively drive each of said groups of thermal printing elements, and if not (3) determining an optimum number of printing cycles less than (B) and greater than one for printing the printing line in a least print time, and then enabling said driver means in accordance with the optimum number.

11. The portable hand held data terminal of claim 10 wherein said print control means determines the optimum number of printing cycles less than (B) and greater than one by identifying any combination of two or more of said groups of thermal printing elements in which a summation of (D1), (D2), . . . (Dn) is less than A/B, said print control means then enabling said driver means to successively drive said combination of said groups and any remaining groups, said remaining groups being driven in combination or individually depending on whether the summation of (D1), (D2), . . . (Dn) for said remaining groups is less than A/B.

12. The portable hand held data terminal of claim 10 further comprising a power supply coupled to said thermal printing means, and wherein a quotient A/B substantially equals a maximum number of said thermal printing elements which can be simultaneously driven by said power supply.

13. A thermal printer for printing images on a sheet of printing material in response to printing signals received from an external signal source, said thermal printing comprising:

a thermal printing head having a plurality of thermal printing elements grouped in at least two groups positioned adjacent the sheet of printing material, each thermal printing element having a capability of printing a dot on the sheet of printing material in response to a dot signal;

driver means coupled to said thermal printing head for providing the dot signals to selected ones of said groups of thermal printing elements; and print control means responsive to the print signals from the external signal source for generating the dot signals for each printing line and providing the dot signals to said driver means, said print control means (1) counting a number of dot signals in at least two groups corresponding to the at least two groups of thermal printing elements in each printing line, (2) sorting the at least two groups of dot signals and determining an optimum combination of said groups of thermal printing elements to receive the dot signals in order to minimize print time for each printing line, and (3) enabling said driver means to drive selected ones of said groups of thermal printing elements in accordance with the optimum combination.

14. The thermal printer of claim 13 further comprising a power supply coupled to said thermal printing head, said power supply providing a power level less than the power level required to simultaneously drive all of said thermal printing elements.

15. The thermal printer of claim 13 wherein said power supply is a small sized portable power supply.

16. The thermal printer of claim 13 wherein the power level of said power supply is substantially equal to a maximum current capacity of the thermal printing elements of a largest of said groups of thermal printing elements.

17. The thermal printer of claim 16 wherein the power level of said power supply is substantially equal to the maximum current capacity of approximately 96 thermal printing elements.

18. The thermal printer of claim 16 wherein said thermal printing elements is approximately 384, the number of groups is four and the power level of said power supply is substantially equal to the maximum current capacity of 96 thermal printing elements.

19. The thermal printer of claim 13 wherein said plurality of thermal printing elements is (A), said at least two groups of thermal printing elements is (B), (C) equals a number of dot signals in one printing line and (D1), (D2), . . . (Dn) equals the number of dot signals in group (B1), (B2), . . . (Bn), said print control means counting (C) for each printing line and (1) determining if (C) is less than or equal to A/B, and if so, enabling said driver means to simultaneously drive all said groups of thermal printing elements, and if not, (2) determining (D) for said group having a smallest number of dot signals (D min) and determining if (D min) is greater than one half of A/B, and if so, enabling said driver means to successively drive each of said groups of thermal printing elements, and if not (3) determinig an optimum number of printing cycles less than (B) and greater than one for printing the printing line in a least print time, and then enabling said driver means in accordance with the optimum number.

20. The thermal printer of claim 19 wherein said print control means determines the optimum number of printing cycles less than (B) and greater than one by identifying any combination of two or more of said groups of thermal printing elements in which a summation of (D1), (D2), . . . (Dn) is less than A/B, said print control means then enabling said driver means to successively drive said combination of said groups and any remaining groups, said remaining groups being driven in combination or individually depending on whether the summation of (D1), (D2), . . . (Dn) for said remaining groups is less than A/B.

21. The thermal printer of claim 20 further comprising a power supply coupled to said thermal printing means, and wherein a quotient A/B substantially equals a maximum number of said thermal printing elements which can be simultaneously driven by said power supply.

22. The thermal printer of claim 13 wherein said print control means comprises a counter to count the dot signals in each printing line, said print control means resetting said counter at the end of each printing line.

23. The thermal printer of claim 13 wherein said driver means comprises a number of driver sections corresponding to the number of said groups of thermal printing elements, said driver sections being coupled in a one to one relationship with said groups, said print control means selectively enabling said driver sections to drive selected ones of said groups of thermal printing elements in accordance with the optimum combination.

24. The thermal printer of claim 23 wherein said driver means further comprises:

a shift register which receives and temporarily stores the dot signals from said print control means; and latch means coupled to said shift register for receiving the dot signals from said shift register and latching the dot signals in response to a control signal from said print control means, said latch means supplying the dot signals to said driver sections.

25. A thermal printing apparatus for printing an image on a heat sensitive material, said thermal printing apparatus comprising:

data means for generating dot signals in accordance with data from a data source;

thermal printing means including a plurality of heat generating elements for generating heat in response to the dot signals;

counting means coupled to said data means for counting the dot signals in each printing line and generating a number signal indicating a number of dot signals in each printing line counted by said counting means; and control means coupled to said counting means and said thermal printing means for grouping the number signal into at least two groups of dot signals, sorting the at least two groups of dot signals and determining an optimum combination of said groups of thermal printing elements to receive the dot signal and for controlling said thermal printing means in accordance with the optimum combination so that a selected number of said heat generating elements are simultaneously enabled to generate heat, the selected number being less than or equal to all the heat generating elements.

26. The thermal printing apparatus of claim 25 wherein said thermal printing means is a thermal printing head comprising a line of said heat generating elements.

27. The thermal printing apparatus of claim 25 wherein said heat generating elements are divided into a plurality of groups.

28. The thermal printing apparatus of claim 25 further comprising power supply means for providing current to said heat generating elements in response to the dot signals.

29. The thermal printing apparatus of claim 28 wherein said heat generating elements are divided into a plurality of groups and a number of said heat generating elements in each group is determined in accordance with a maximum current capacity of said power supply means.

30. The thermal printing apparatus of claim 29 wherein said control means includes a control device which controls said thermal printing means so that one or more of said groups of heat generating elements generate heat simultaneously in accordance with the number signal.

31. The apparatus of claim 30 wherein said control device determines which of said groups of heat generating elements should be simultaneously enabled to minimize print time, and then enables said power supply to provide said groups of heat generating elements with power simultaneously.

32. A method for forming an image on printing material in accordance with heat generated by a plurality of thermal printing elements, the method comprising the steps of:

generating dot signals to drive selected ones of said plurality of thermal printing elements in accordance with the image to be printed;

counting a number of dot signals in a printing line;

grouping the counted number of dot signals into at least two groups;

sorting the at least two groups of dot signals;

determining an optimum combination of said plurality of thermal printing elements to be driven by the dot signals in order to minimize print time for each printing line; and simultaneously driving selected ones of said thermal printing elements in accordance with the optimum combination.

33. The method of claim 32 further comprising the step of dividing said thermal printing elements into a plurality of groups of thermal printing elements.

34. The method of claim 32 wherein a power supply provides current to said thermal printing elements in response to the dot signals, the method further comprising the step of dividing said thermal printing elements into a plurality of groups in accordance with a maximum current capacity of said power supply.

35. The method of claim 34 further comprising the step of determining which of said groups of thermal printing elements should be simultaneously enabled to minimize print time, and then enabling said power supply to provide said groups of thermal printing elements with power simultaneously.

36. The method of claim 35 wherein said plurality of thermal printing element is (A), said at least two groups of thermal printing elements is (B), (C) equals a number of dot signals in one printing line and (D1), (D2), . . . (Dn) equals a number of dot signals in group (B1), (B2), . . . (Bn), the method further comprising the steps of counting (C) for each printing line and (1) determining if (C) is less than or equal to A/B, and if so, simultaneously driving all said groups of thermal printing elements, and if not, (2) determining (D) for said group having a smallest number of dot signals (D min) and determining if (D min) is greater than one half of A/B, and if so, successively driving each of said groups of thermal printing elements, and if not, (3) determining an optimum number of printing cycles less than (B) and greater than one for printing the printing line in a least print time, and then driving said groups of thermal printing elements in accordance with the optimum number.

37. The method of claim 36 further comprising the steps of determining the optimum number of printing cycles less than (B) and greater than one by identifying any combination of two or more of said groups of thermal printing elements in which a summation of (D1), (D2), . . . (Dn) is less than A/B, then successively driving said combination of said groups and any remaining groups, said remaining groups being driven in combination or individually depending on whether the summation of (D1), (D2), . . . (Dn) for said remaining groups is less than A/B.

38. The method of claim 36 wherein said plurality of thermal printing elements are driven by a power supply, the method further comprising the step of setting a quotient of A/B substantially equal to a maximum number of said thermal printing elements which can be simultaneously driven by said power supply.

* * * * *